US008006715B2

(12) United States Patent
Shafer et al.

(10) Patent No.: US 8,006,715 B2
(45) Date of Patent: Aug. 30, 2011

(54) VALVE WITH THIN-FILM COATING

(75) Inventors: Scott F. Shafer, Morton, IL (US); Bryan Moore, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 680 days.

(21) Appl. No.: 11/858,679

(22) Filed: Sep. 20, 2007

(65) Prior Publication Data

US 2009/0078906 A1 Mar. 26, 2009

(51) Int. Cl.
*F16K 25/00* (2006.01)

(52) U.S. Cl. .................... 137/375; 251/129.16; 251/333

(58) Field of Classification Search ............ 251/129.16, 251/333; 137/375; 239/585.1
See application file for complete search history.

(56) References Cited

U.S. PATENT DOCUMENTS

| | | | | |
|---|---|---|---|---|
| 1,686,849 | A * | 10/1928 | Frauenheim | 251/332 |
| 1,748,169 | A * | 2/1930 | Campbell | 251/333 |
| 3,395,890 | A * | 8/1968 | Eckert et al. | 251/333 |
| 3,979,105 | A * | 9/1976 | Pool et al. | 251/121 |
| 4,501,299 | A * | 2/1985 | Klimowicz et al. | 137/625.65 |
| 4,503,878 | A * | 3/1985 | Taylor | 251/333 |
| 4,721,284 | A * | 1/1988 | Bankard | 251/86 |
| 5,685,492 | A | 11/1997 | Davis et al. | |
| 5,833,142 | A | 11/1998 | Caley | |
| 6,092,781 | A * | 7/2000 | Hohl et al. | 251/129.02 |
| 6,173,912 | B1 | 1/2001 | Gottlieb et al. | |
| 6,286,880 | B1 * | 9/2001 | Pratt | 251/333 |
| 6,349,885 | B1 | 2/2002 | Parrish | |
| 6,367,433 | B2 * | 4/2002 | Oyama et al. | 251/129.16 |
| 6,508,416 | B1 * | 1/2003 | Mastro et al. | 239/585.1 |
| 6,616,064 | B2 | 9/2003 | Boecking | |
| 6,682,003 | B2 | 1/2004 | Limmer | |
| 6,698,449 | B2 * | 3/2004 | Hall et al. | 251/333 |
| 6,789,783 | B2 | 9/2004 | Boecking | |
| 6,817,635 | B2 | 11/2004 | Maier et al. | |
| 6,923,387 | B2 | 8/2005 | Carlisle et al. | |
| 6,978,942 | B2 | 12/2005 | Murdoch | |
| 2003/0042457 | A1 * | 3/2003 | Yoo | 251/309 |
| 2003/0226914 | A1 * | 12/2003 | Mills et al. | 239/585.4 |
| 2004/0129313 | A1 * | 7/2004 | Aharonov et al. | 137/375 |
| 2004/0187798 | A1 * | 9/2004 | Schneider et al. | 123/1 A |
| 2005/0001190 | A1 * | 1/2005 | Shirase et al. | 251/129.15 |
| 2005/0098664 | A1 * | 5/2005 | Catasus-Servia | 239/585.1 |

(Continued)

FOREIGN PATENT DOCUMENTS

DE 102004046886 4/2006

(Continued)

OTHER PUBLICATIONS

"Hard Coatings for Highly Stressed Surfaces," *Bosch Research Info*, Issue 3, 2001.

*Primary Examiner* — John Bastianelli
(74) *Attorney, Agent, or Firm* — Finnegan, Henderson, Farabow, Garrett & Dunner LLP

(57) ABSTRACT

A fuel system component is provided. The fuel system component may comprise a valve body having a substantially conical surface region including a first coating. The component may further include a valve seat having a first surface region with a substantially conical surface including a second coating. The coating of the valve seat is configured to engage at least a portion of the coating of the substantially conical surface region of the valve body.

25 Claims, 8 Drawing Sheets

U.S. PATENT DOCUMENTS

| | | | | |
|---|---|---|---|---|
| 2005/0199840 | A1* | 9/2005 | Brinks et al. | 251/124 |
| 2006/0202049 | A1* | 9/2006 | Miller | 239/585.1 |
| 2007/0057088 | A1 | 3/2007 | Sebastian | |
| 2007/0262282 | A1* | 11/2007 | Artherholt | 251/309 |

FOREIGN PATENT DOCUMENTS

| | | |
|---|---|---|
| EP | 1 180 596 B1 | 12/2003 |
| EP | 1387082 | 2/2004 |
| GB | 2341911 | 3/2000 |
| KR | 20010073837 | 8/2001 |
| WO | WO 95/05537 | 2/1995 |
| WO | WO 02/02932 A1 | 1/2002 |
| WO | 03006821 | 1/2003 |
| WO | 2004033895 | 4/2004 |

* cited by examiner

VALVE WITH THIN-FILM COATING

TECHNICAL FIELD

This disclosure pertains generally to fuel system components, and more particularly, to fuel system components having thin-film coatings.

BACKGROUND

Many internal combustion engines, whether compression ignition or spark ignition engines, use fuel injection systems to provide precise and reliable fuel delivery into the combustion chamber of the engine. Such precision and reliability are necessary to address the goals of improved fuel efficiency, maximum power output, and reduction of undesirable emissions. Generally, fuel systems will include a fuel pump and one or more fuel injectors. The fuel pump will supply fuel to the injectors, which will subsequently provide precise control of the fuel supply and timing to engine cylinders.

Traditionally, hard coatings can be applied to components of fuel systems to reduce wear and/or prevent corrosion. For example, where opposing parts contact one another, a coating may be used to reduce wear between the components by controlling friction and/or providing increased resistance to wear. However, it is generally believed that it is desirable to apply a coating to only one surface of opposing parts, while producing another opposing surface from a softer, uncoated metal (e.g., a steel substrate) or other material that is softer than the hard coating. In this way, the uncoated, softer material may be polished or reshaped by the opposing coating to produce a smooth surface and/or more desirable shape that results in a reduced overall wear rate.

In addition, whether using bare metal or coated components in fuel system components, the fuel system components may include specific geometries that control the surface area over which the components engage one another. For example, various valves, such as three-way valves, which are used in fuel injectors, include a valve body and valve seat against which the valve body rests. To prevent fluid flow through the valve, the valve body is pressed against the valve seat. In this configuration, the shapes of the valve body and valve seat affect the surface area and pressure exerted on the component materials. This in turn affects the performance of the valve and also may affect how the valve body and/or valve seat wear during use.

One prior art fuel system valve is disclosed in U.S. Pat. No. 6,173,912, which issued to Gottlieb et al. on Jan. 16, 2001 (hereinafter "the '912 patent"). The valve of the '912 patent includes a valve body having a valve seat and a valve plate. The valve plate abuts the valve seat in a closed condition, and a seal gap is formed in an open condition. The surfaces of the valve seat and valve plate are angled such that the cross-sectional area of the seal gap decreases in a direction of the flow of a liquid through the valve.

Although the valve seat and plate of the '912 patent may be suitable for some applications, the valve seat and plate of the '912 patent may have some drawbacks. For example, the valve plate and valve seat may be produced from materials that will produce unacceptably high wear rates in the use of certain newer fuels. Further, improved overall device performance may be achieved with newer materials selected for both components of the valve seat and plate. However, the use of hard coatings with the valve seat and plate of the '912 patent may produce unacceptably high wear rates because the valve and seat of the '912 patent may be configured such that the pressure between the valve and seat is localized to a small area. Further, when such a configuration is used with uncoated valve materials, or in valves in which only one of the valve seat or plate is coated, the uncoated materials may be deformed to allow the materials to be broken in, thereby producing a larger seat-to-plate contact area. However, when harder coatings are used, such coatings may not break in as readily, and therefore, it may be desirable to produce valve geometries that produce contact areas between a coated valve body and coated valve seat that will produce suitable control of fluid flow with coated components.

The disclosed valves aid in overcoming one or more of the aforementioned problems and the shortcomings of the related art solutions to such problems.

SUMMARY OF THE INVENTION

A first aspect of the present disclosure includes a fuel system component. The fuel system component may comprise a valve body having a substantially conical surface region including a first coating. The component may further include a valve seat having a first surface region with a substantially conical surface including a second coating. The coating of the valve seat is configured to engage at least a portion of the coating of the substantially conical surface region of the valve body.

A second aspect of the present disclosure includes a method of producing a fuel system component. The method may include producing a valve body having at least one substantially conical surface region and applying a first coating to the substantially conical surface region. The method may further include producing a valve seat including a first surface region having a substantially conical surface configured to engage at least a portion of the coating of the substantially conical surface region of the valve body and applying a second coating to the substantially conical surface region of the valve seat.

A third aspect of the present disclosure includes a fuel system component. The fuel system component may comprise a valve body having a curvilinear surface region including a first coating, and a valve seat. The valve seat may include at least one surface region including a second coating, and wherein the second coating is configured to engage at least a portion of the first coating.

DETAILED DESCRIPTION

Figure 1:
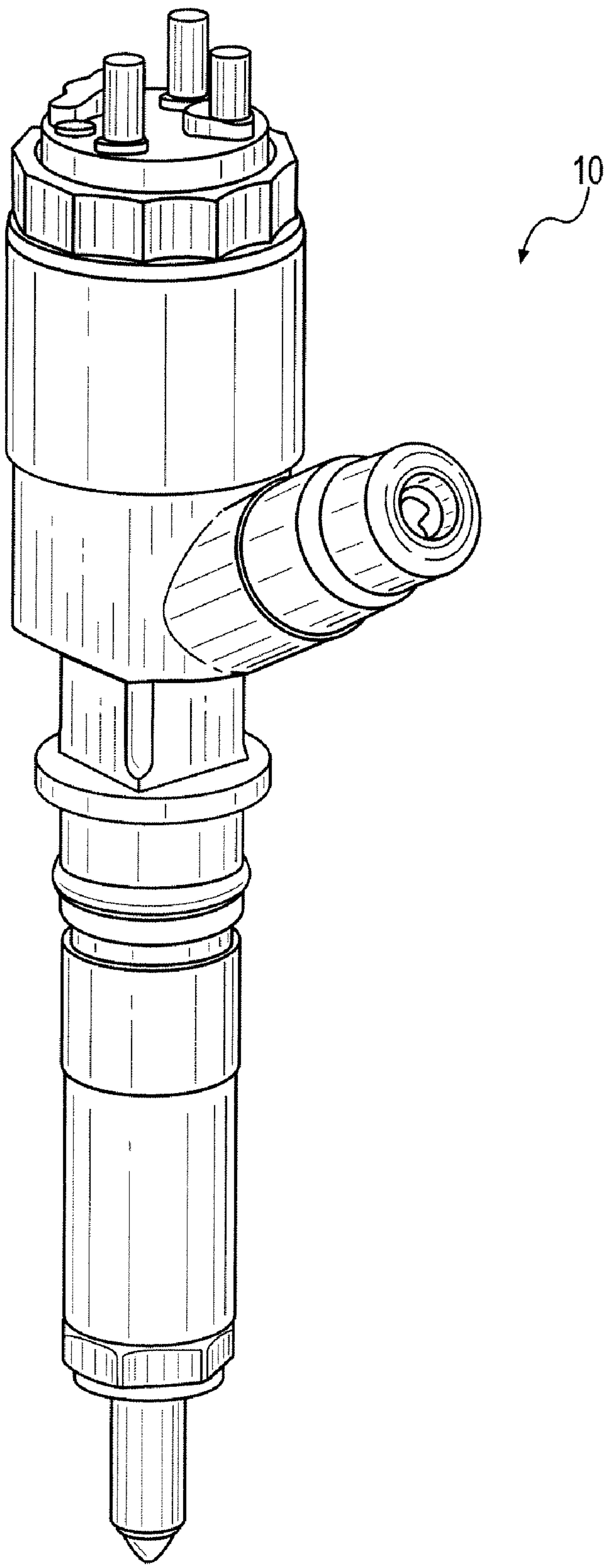
FIG. 1 illustrates a fuel injector, according to an exemplary embodiment.

FIG. 1 illustrates a fuel system component according to an exemplary embodiment. As described in detail below, the component can include at least one valve body configured to engage a valve seat to control fluid flow through a valve. Further, in some embodiments, the body and seat will be configured to repeatedly engage one another to produce impact between opposing surfaces of the valve body and seat. In addition, the opposing surfaces of the valve body and seat may include hard coatings configured to reduce wear caused by repeated engagement of the valve body and seat.

As shown, the component includes a fuel injector 10, as may be used with diesel or gasoline engines. However, it will be appreciated that the fuel system components of the present disclosure may be used with other fuel systems for other engine types, and with different types of fuel injectors in which it may be desirable to control wear between opposing valve surfaces (e.g., a common rail injector system). For example, the components of the present disclosure may be used in fuel pump assemblies (e.g., where nail valves may be used), and may be used with mechanically-actuated or hydraulically-actuated injectors.

Figure 2:
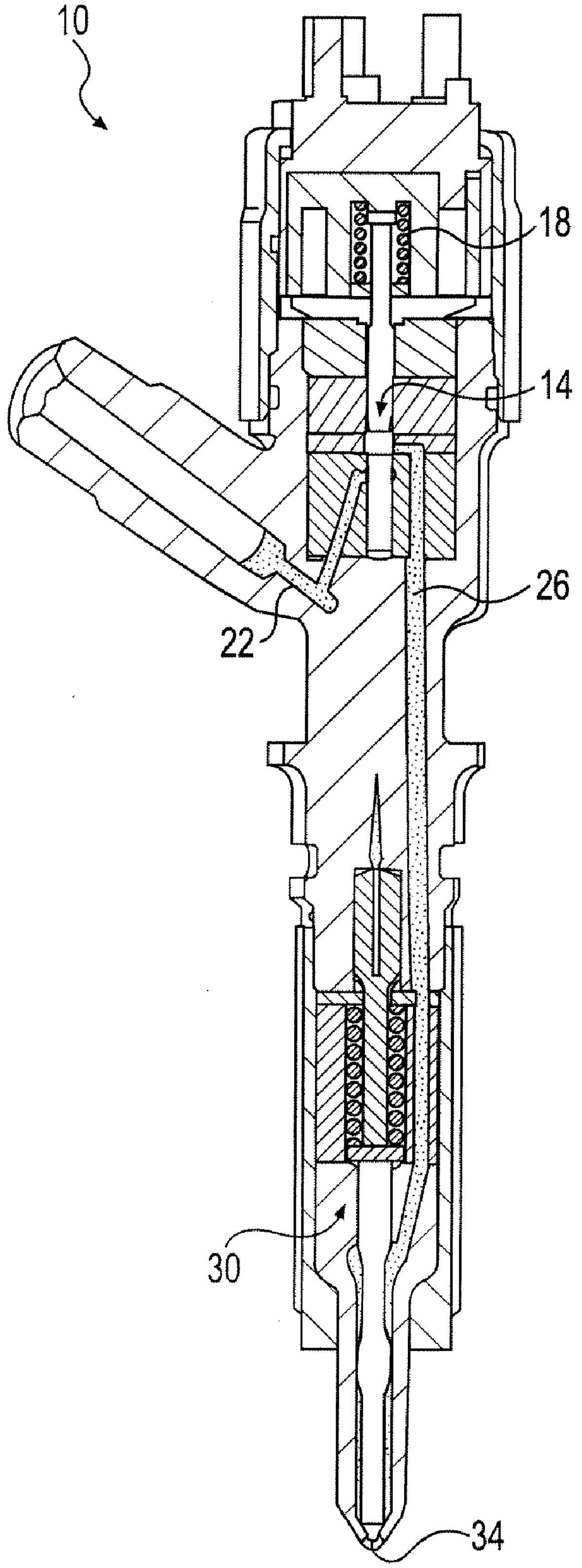
FIG. 2 illustrates a cross-sectional view of the fuel injector of FIG. 1, according to an exemplary embodiment.

FIG. 2 illustrates a cross-sectional view of the fuel injector 10 of FIG. 1, according to an exemplary embodiment. As shown, injector 10 includes a fluid intake line 22, which supplies fuel to injector 10. Further, injector 10 includes an injection line 26 fluidly connected with intake line 22 via a valve 14. The operation of valve 14 can be controlled by a control system, such as a solenoid 18. Further, periodic opening and closing of valve 14 will allow fuel to be supplied via intake line 22, so that the fuel can be injected into an engine cylinder through an injector opening 34.

Figure 3:
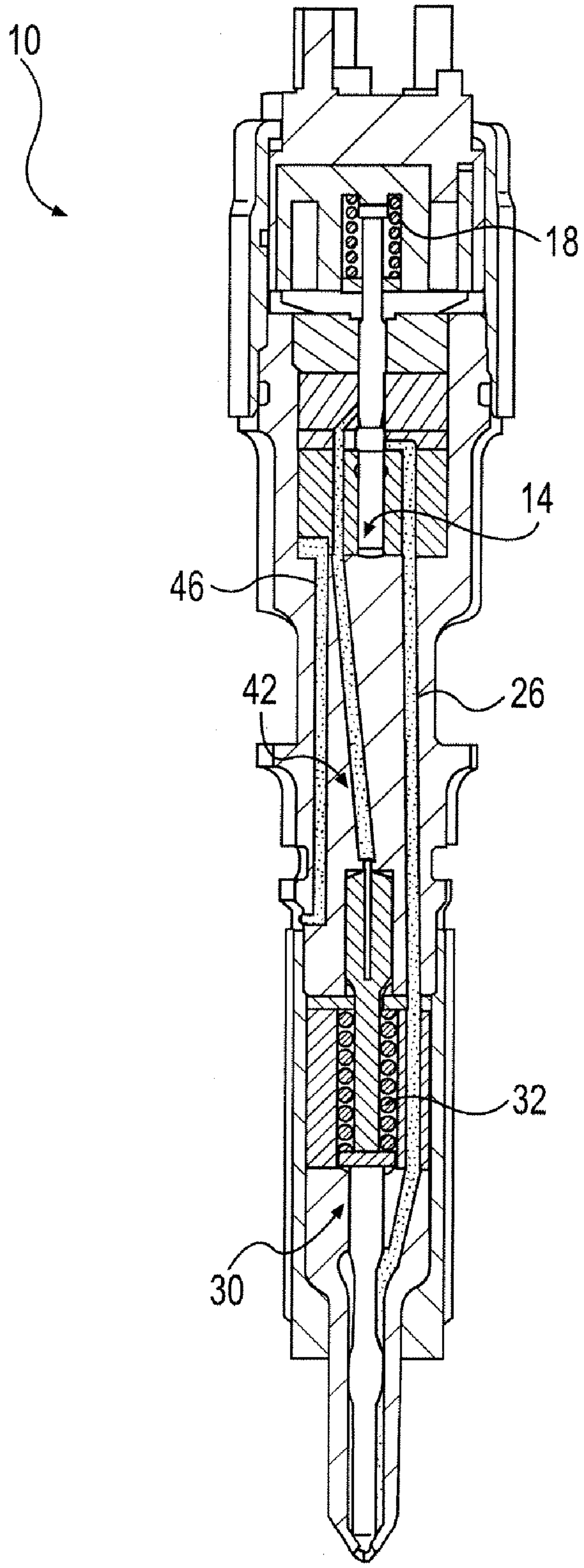
FIG. 3 illustrates another cross-sectional view of the fuel injector of FIG. 1, showing additional components of the fuel injector, according to an exemplary embodiment.

FIG. 3 illustrates another cross-sectional view of the fuel injector 10 of FIG. 1, showing additional components of injector 10, according to an exemplary embodiment. As shown, injector 10 further includes a check control line 42 and a drain line 46. When the valve 14 is in an upper position, pressurized fluid passes through intake line 22 and into injection line 26, thereby increasing the fuel pressure within injection line 26 increases. Subsequently, solenoid 18 de-energizes, lowering a valve body (described in detail below). When the valve 14 is in the lower position, fluid flows through valve 14 and into check control line 42. As the pressure in check control line 42 increases, a check valve 30 is closed by the combined force produced by the fluid in control line 42 and a spring mechanism 32, thereby ending injection. Finally, control line 42 is fluidly-connected with a drain line 45, and excess fluid in injector 10 drains through drain line 46.

Figure 4:
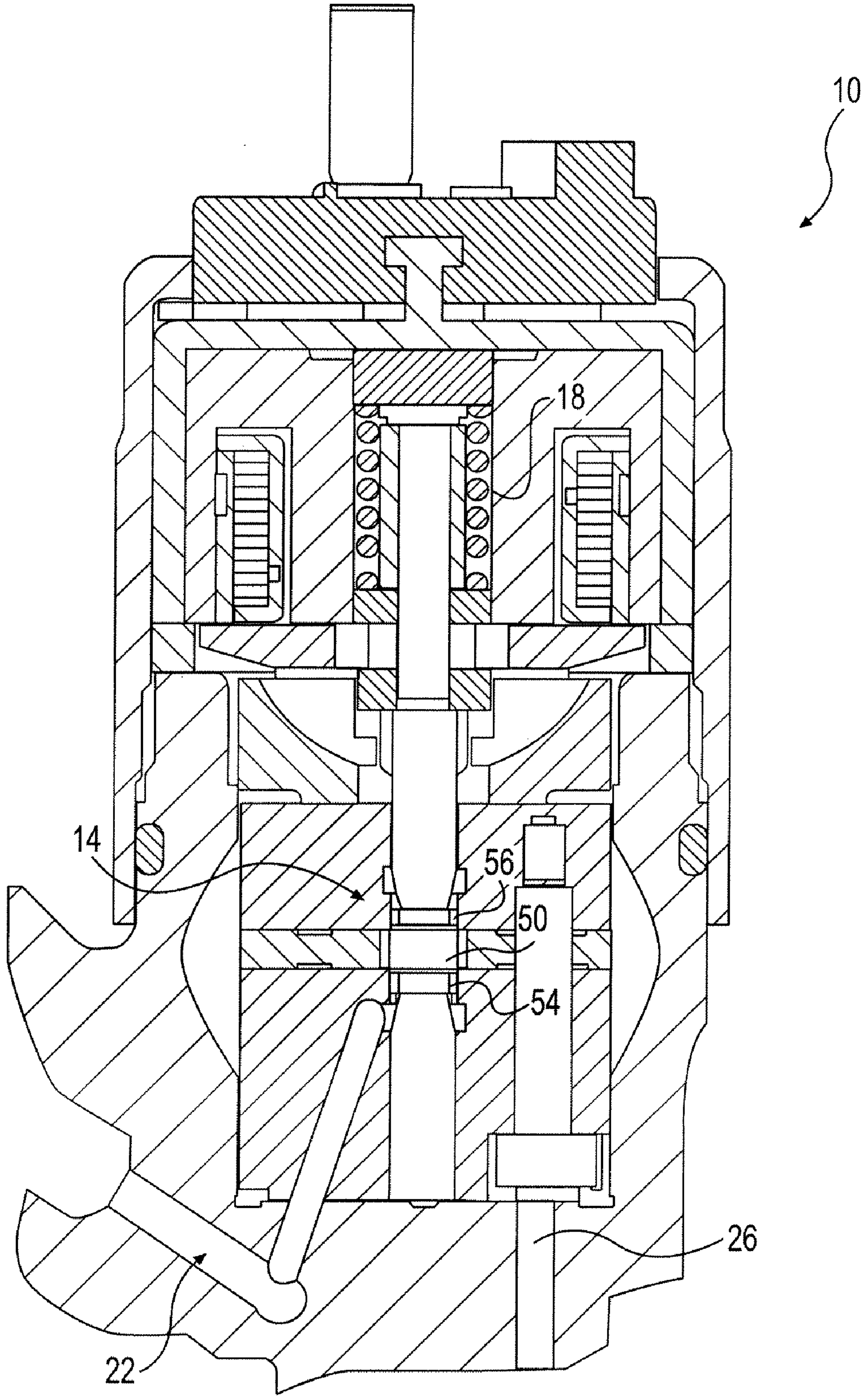
FIG. 4 illustrates a portion of the injector of FIG. 1, including a valve body and lower and upper valve seats, according to one exemplary embodiment.

FIG. 4 illustrates a portion of injector 10 of FIG. 1, including a valve body 50 and lower and upper valve seats 54, 56, according to one exemplary embodiment. As noted, valve 14 is configured to control the flow of fluid between intake line 22 and injection line 26, and between injection line 26 and check control line 42. In some embodiments, valve body 50 is configured to move up and down through control of a solenoid 18 or other suitable control mechanism (e.g., a piezo actuator). As valve body 50 moves up and down, body 50 engages, alternatively, an upper valve seat 56 or lower valve seat 54. Further, as valve body engages upper seat 56 and simultaneous disengages lower seat 54, flow of fluid between injection line 26 and check control line 42 is blocked, while fluid is allowed between flow from intake line 22 and injection line 26. Conversely, as valve body 50 engages lower seat 54 and simultaneous disengages upper seat 56, flow of fluid between intake line 22 and injection line 26 is blocked, while fluid is allowed to between from injection line 26 and check control line 42. The repeated engagement and disengagement of valve body 50 and seats 54, 56 causes impact, and possible wear, of body 50 and seats 54, 56.

Figure 6:
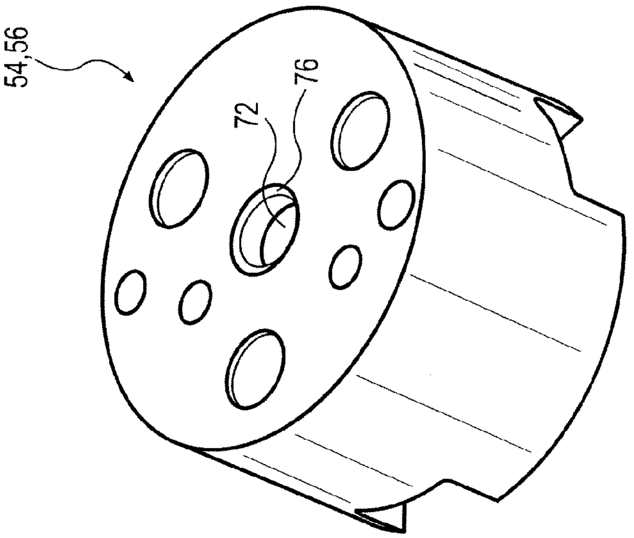
FIG. 6 illustrates a valve seat as may be used with the valve body of FIG. 5 according to one exemplary embodiment.
Figure 5:
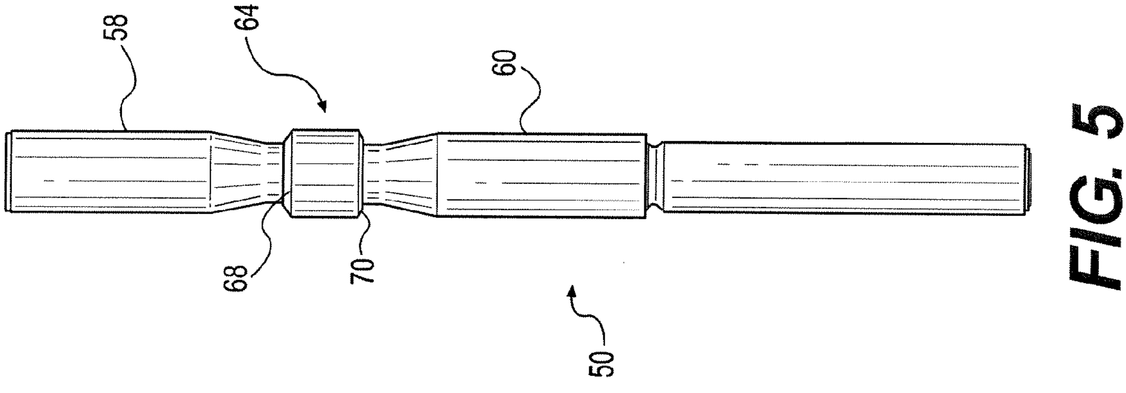
FIG. 5 illustrates a valve body, according to one exemplary embodiment.

FIG. 5 illustrates a valve body 50 according to one exemplary embodiment; and FIG. 6 illustrates a valve seat 54, 56 as may be used with the valve body of FIG. 5. As shown, valve body 50 can include two elongated sections 58, 60, which will extend through an opening 72 in valve seat 54, 56. Further, elongated sections 58, 60 may extend through elongated bores adjacent valve seats 54, 56 to engage a control mechanism, such as solenoid 18.

In some embodiments, valve body 50 will also include a main valve body section 64, which can include one or more conical surface regions 68, 70. Conical surface regions 68, 70 can be configured to engage a valve at an engagement region 76. As described in detail below, part or all of valve body 50 and valve seats 54, 56 may include a coating material configured to provide wear resistance to opposing surfaces of body 50 and seats 54, 56.

Valve body 50 and valve seats 54, 56 can be produced from a number of suitable materials. For example, in some embodiments, body 50 and seats 54, 56 will include a substrate material on which selected coatings are applied. Suitable substrate materials can include any suitable steel, such as a low alloy steel, a tool steel, 51200 steel, and/or any other material. Suitable materials can be selected based on desired physical properties (e.g., resistance to deformation), and/or ability to bond with overlying coatings and to withstand elevated temperatures, as may be present during coating deposition or device use.

In some embodiments, the body and/or seat substrate materials can include a low alloy steel. The term low alloy, as used herein, will be understood to refer to steel grades in which the hardenability elements, such as manganese, chromium, molybdenum and nickel, collectively constitute less than about 3.5% by weight of the total steel composition. Further, low alloy steels may be selected for fuel injector components due to relatively low cost and high reliability of such steels.

The selected coating materials can include various metal nitrides, metal carbides, and carbon-based materials. In some embodiments, the coating material can include at least one metal nitride selected from chromium nitride, zirconium nitride, molybdenum nitride, titanium-carbon-nitride, or zirconium-carbon-nitride. Alternatively, the coating material can include a diamond-like carbon (DLC) material such as titanium-containing-DLC, tungsten-DLC, or chromium-DLC.

Prior to coating a selected substrate material, the material may be prepared by cleaning and/or surface treating. For example, cleaning can be accomplished through a number of conventional methods such as degreasing, grit blasting, etching, chemically-assisted vibratory techniques, and the like. Further, surface finishing can be performed to enhance coating adhesion and/or to affect coating structure. For example, in some embodiments, the desired substrate surface can be produced by a grinding or polishing process, through ultrasonic cleaning with an alkaline solution, and/or ion-etching of the substrate surface. In addition, in some embodiments, selected substrates may be heat treated prior to application of a coating to prevent further changes in substrate dimensions after or during coating deposition.

The desired coating can be produced using a number of suitable processes. For example, suitable metal nitride and DLC coatings can be produced using various physical vapor deposition (PVD) and/or chemical vapor deposition (CVD) processes. Further, hybrid processes can be used. The desired coating process can be selected based on a number of factors, including, for example, cost, speed of production, and control of coating composition and structure.

Further, the coating production process may be selected based on the type of substrate material selected for valve body 50 and valve seat 54, 56. For example, some substrates may be affected by elevated temperatures, and the coating process may be selected to minimize adverse effects of the process on selected substrates, e.g., by limiting the process temperature and/or time. For example, arc vapor or sputtering processes (e.g., magnetron sputtering) may be selected to produce chromium nitride coatings, and suitable processes may be selected to maintain temperatures below 250° C. or even below 150° C. to prevent dimensional changes in underlying substrates.

Suitable PVD processes can include, for example, arc vapor deposition and sputtering. In general, in arc vapor deposition, an arc source is adapted to impart a positive charge on a generated vapor, and a negative bias voltage is applied to a substrate to deposit a coating on the selected substrate. In sputtering processes particles are accelerated at a target material including a material to be deposited on a selected substrate. As the particles strike the target, small amounts of the target are released and deposited uniformly on the substrate.

The coating thickness on valve body 50 and seats 54, 56 may be generally uniform, as measured on a sample of the fuel injector components by scanning electron microscopy, by X-ray fluorescence, through use of the ball-crater test at a plurality of locations on valve body 50 or seats 54, 56, or through other suitable techniques. In one embodiment, the coating may have a thickness between about 0.5 microns and about 1.7 microns.

In some embodiments, to provide improved adhesion of the primary coating, it may be desirable to apply a bond layer to a substrate material before application of a primary coating. For example, in some embodiments, a chromium layer or other suitable metal layer may be applied to a low alloy steel substrate to form a bond layer, and a metal nitride or DLC coating may be applied to the bond layer. If used, the optional bond layer material may be applied using a similar vapor deposition process to yield a bond layer having a thickness of generally between about 0.05 micron and about 0.5 microns; however, a range of suitable thicknesses may be selected based on the specific substrate and coatings used.

It may be desirable to produce the selected coatings generally free of surface defects. Further, the coatings can include specified surface texture ratings or surface texture measurements dependent on the intended use of the component. Surface defects can generally be observed on a sample of valve body 50 and/or valve seats 54, 56 through the observation of multiple points on the surface of the samples at about one hundred times magnification. The surface observations can be compared to various classification standards to determine if the coating is substantially free from surface defects. In addition, coating layers should generally adhere to the selected substrate material. Coating adhesion can be assessed for a given population of fuel injector components, for example, by using standard hardness tests (e.g., Rockwell C hardness measurements) in which impact locations on component surfaces are observed and compared to various adhesion classification standards.

It should be noted that selected coatings can be applied to all or part of valve body 50 and/or valve seats 54, 56. For example, in one embodiment, coatings may be applied to portions of body 50 and seats 54, 56 that will engage one another during use. However, even though regions of body 50 and seats 54, 56 may not require a coating to prevent wear, it may be desirable, in some situations, to apply coatings to these regions of valve body 50 and seats 54, 56. For example, coatings may be applied to the entire upper surfaces of valve seats 54, 56 to prevent the need for masking portions of valve seats 54, 56 to coat only selected (i.e., nomnasked) areas. In addition, coatings may be applied to all visible portions of valve body 50 or seats 54, 56 to provide a uniform appearance or surface finish. In addition, coatings may be applied to substantially all of valve body 50, but a portion of one of both of elongated sections 58, 60 may be uncoated to allow engagement with or prevent interference with the operation of a control mechanism such as solenoid 18.

Figure 7:
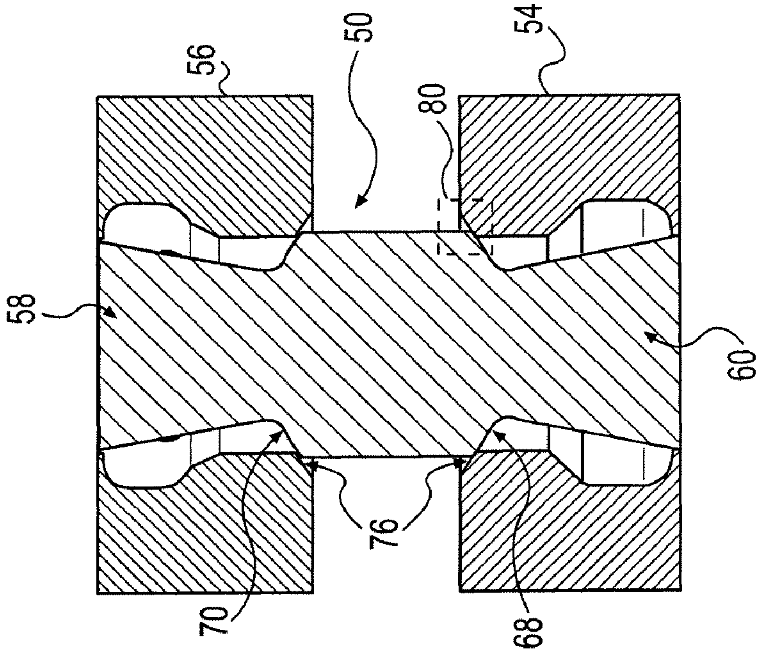
FIG. 7 illustrates a cross-sectional view of a valve body and valve seat when engaging one another in a closed valve configuration.

FIG. 7 illustrates a cross-sectional view of a valve body 50 and valve seats 54, 56 when engaging one another in one of the two closed valve configurations. As noted, valve body 50 can include two conical regions 68, 70 configured to engage valve seats 54, 56 at seat engaging regions 76. As noted, the body 50 and seats 54, 56 can engage one another in impact. Further, for some coatings and geometries, this impact can cause wear of one coating, thereby breaking-in the coating, and exposing bare substrate, while still allowing low leakage and overall wear rates. Further, in other embodiments, the coatings and seat geometries may be selected to reduce the likelihood of coating break-in.

In some embodiments, the valve body 50 and valve seats 54, 56 will include a conventional differential-angle conical valve. In such configurations, the body 50 and seat 54, 56 will engage one another at an angle that does not provide flush contact initially. Further, as the valve is used, the seat may wear or break-in to expose bare substrate, thereby producing continued sealing throughout the valve life.

Figure 8:
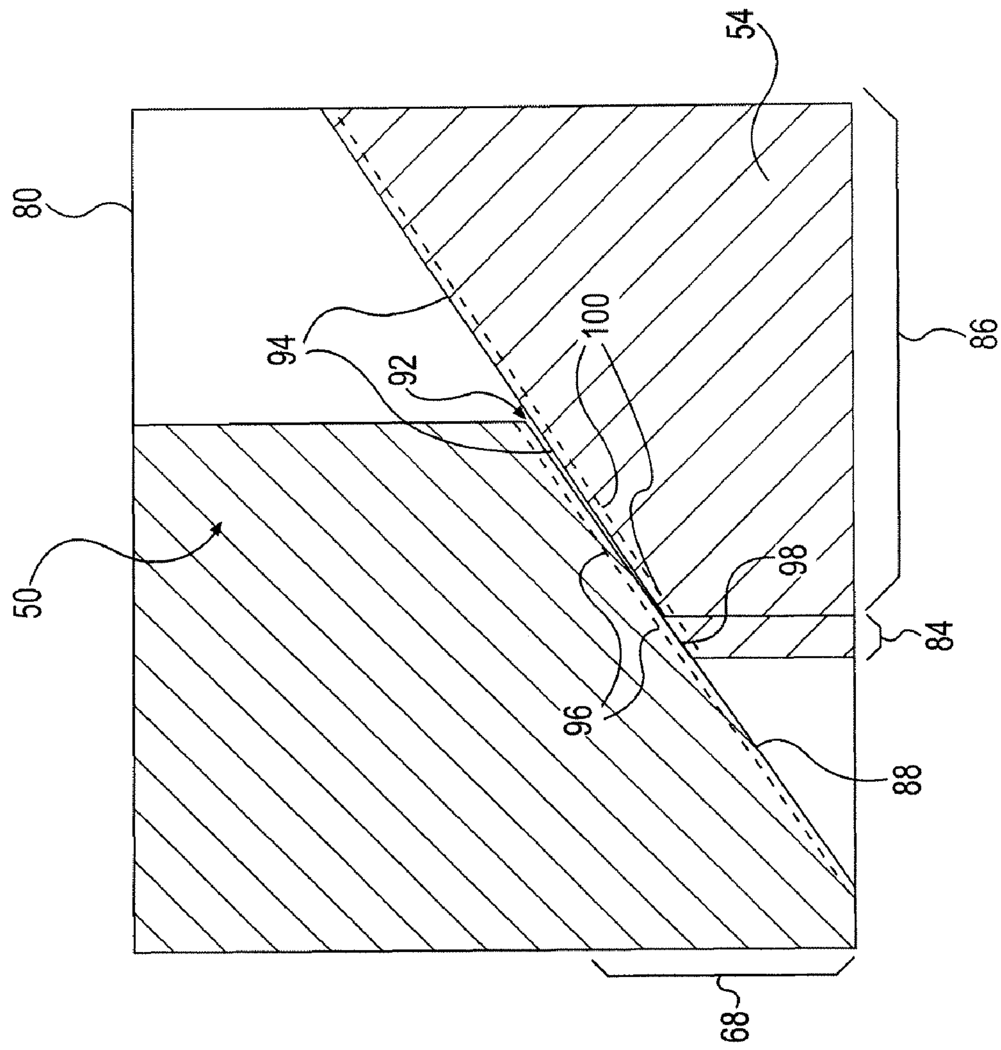
FIG. 8 illustrates an enlarged view of the valve body and valve seat of FIG. 7, including coatings on the opposing surfaces of the valve body and valve seat, according to one exemplary embodiment.

In addition, in some embodiments, seat engaging regions 76 can include a shape or configuration that allows precise control over the surface area in which coated portions of valve body 50 and valve seats 54, 56 contact one another. FIG. 8 illustrates an enlarged view 80 of the valve body and valve seat of FIG. 7, including coatings 96, 100 on opposing surfaces 88, 98 of valve body 50 and valve seat 54, respectively. As shown, body 50 includes an angled surface 88 that forms conical section 68. In addition, seat 54 can include a first surface region 84 having a substantially conical shape that conforms to the shape of valve body conical section 68, thereby providing substantially flush engagement of coatings 96, 100 of valve body 50 and valve seat 54 at the first surface region 84.

In addition, in some embodiments, valve seat 54 can include a second region 86 that has a surface configuration selected to prevent contact between the valve seat surface 94 and valve body surface 88 along the second region 86. For example, in some embodiments, second surface region 86 may include a substantially conical section having a conical angle greater than that of first region 84, thereby producing a gap 92 between valve body 50 and valve seat 54 beginning at second region 86.

In some embodiments, the width of first region 84 may be selected to produce a precise surface area of contact between valve body 50 and seat 54. For example, the surface area may be selected such that the contact force between body 50 and seat 54 does not exceed the yield strength of selected coatings 96, 100, thereby reducing the likelihood of damage or wear of coatings 96, 100.

Figure 9:
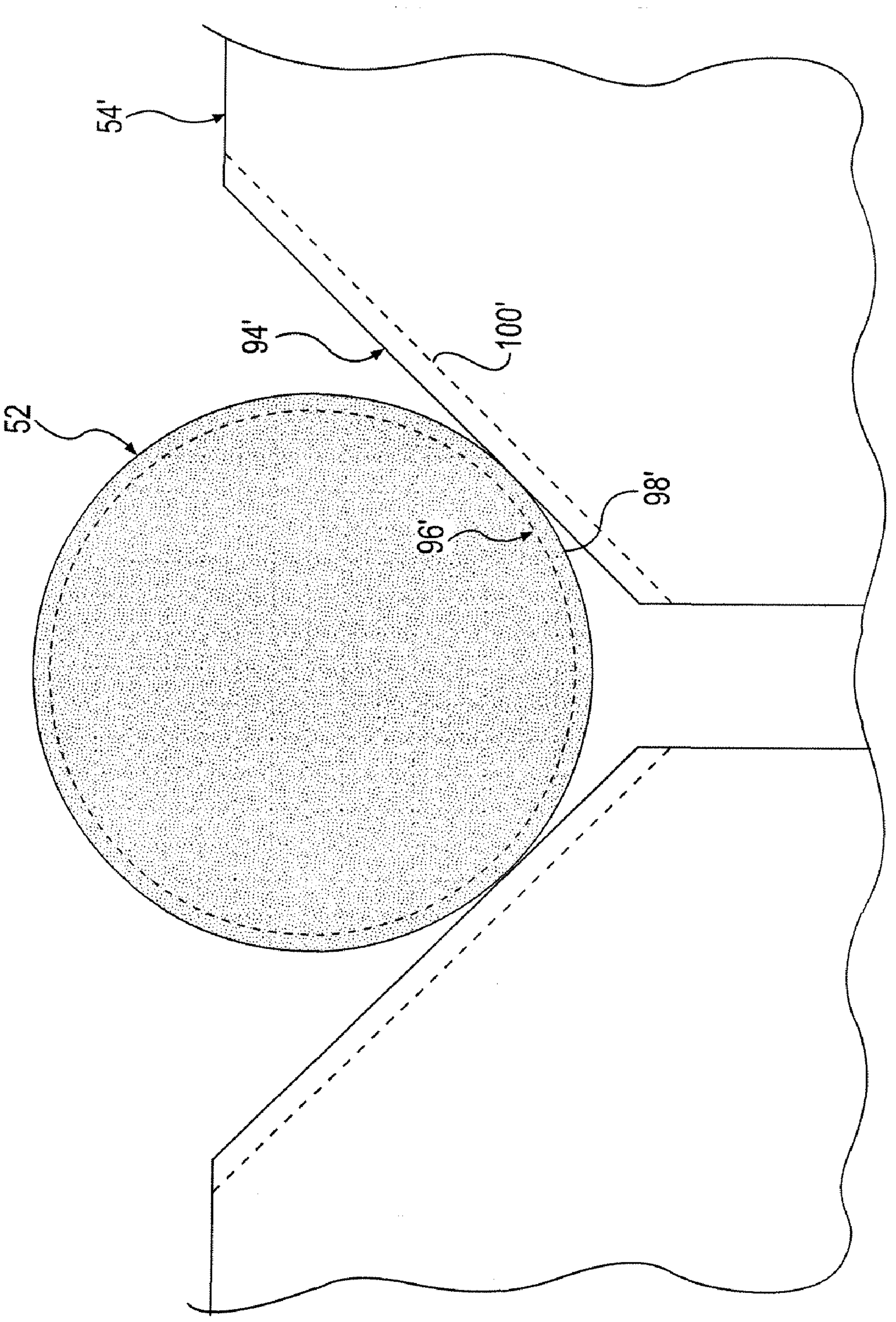
FIG. 9 illustrates a side view of a valve body and valve seat according to another exemplary embodiment.

FIG. 9 illustrates a side view of a valve body 52 and valve seat 54' according to another exemplary embodiment. As shown, valve body 52 includes a curvilinear body having a coating 96'. Further, valve seat 54' includes a conical surface 94' further including a second coating 100'. As shown, a surface 98' of first coating 96' may be configured to engage a conical surface 94' of second coating 100' in impact, thereby allowing the valve to be opened and closed.

Figure 10:
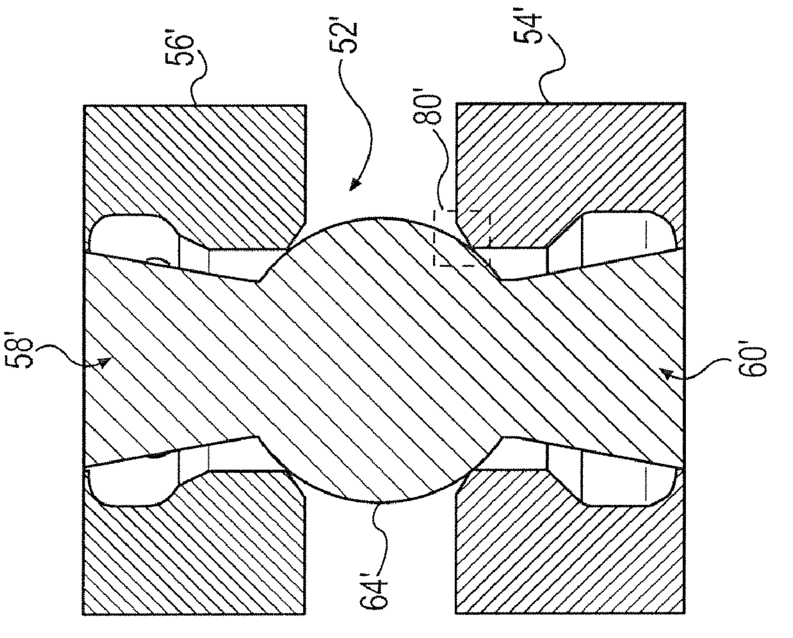
FIG. 10 illustrates a cross-sectional view of another valve body and valve seat when engaging one another in a closed valve configuration.

As shown, valve body 52 may include a free floating ball. Further, movement of body 52 can be effected by one or more of a number of mechanisms known in the art, thereby allowing opening and closing of the valve. Such mechanisms can include various mechanical actuators that may push/pull body 52, hydraulic or other fluidly-actuated means, and/or magnetic systems (e.g., solenoids and/or piezo actuator systems). Further, in some embodiments, as shown in FIG. 10, a curvilinear or substantially-spherical valve body 52' can include a curvilinear main valve body 64' operatively connected or integrally formed valve body elongated sections 58', 60'. These elongated sections 58' 60' may further be connected to a solenoid or other system that allows control of movement of valve body 52'.

As shown, the valve bodies 52, 52' of FIGS. 9 and 10 can be configured to engage a conical surface 94' of valve seat 54' in impact, thereby allowing control of fluid flow through the valve. In some embodiments, curvilinear body 52' will engage a conical portion. As shown in FIG. 9, in one embodiment, valve body 52 engages a substantially flat conical surface of seat 54'. In another embodiment, as shown in FIG. 10, valve body 52' is configured to engage the valve seat at a narrow region at near the inner rim of the seat.

As noted, the valves of FIGS. 9 and 10 can include coatings on opposing surfaces of the valve bodies and seats. Further, with these geometries, the coating on one of the body or seat may wear or break-in during initial use, due to relatively high contact stresses produced by narrow regions of engagement. However, even with wear and exposure of one component, the valve body and seat, having the disclosed coatings, may have improved overall wear life and reduced leakage compared to uncoated components.

Figure 11:
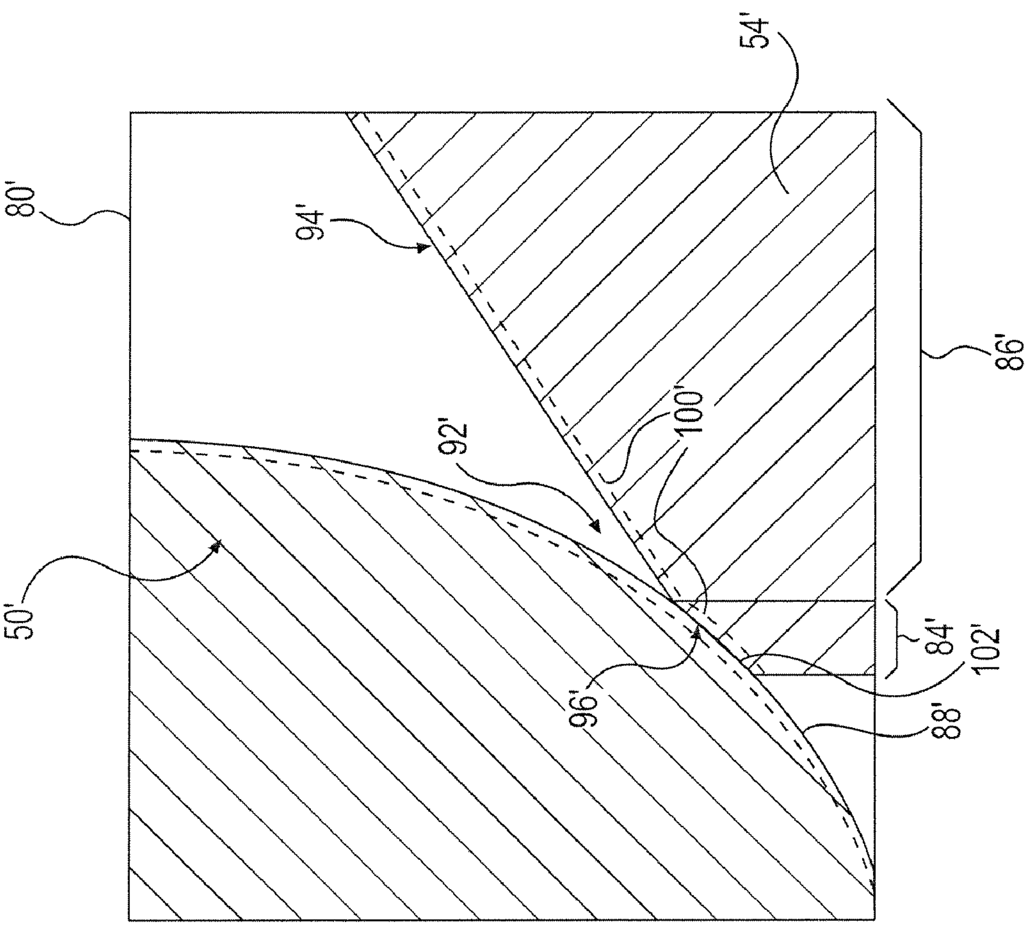
FIG. 11 illustrates an enlarged view of the valve body and valve seat of FIG. 9, including coatings on the opposing surfaces of the valve body and valve seat, according to one exemplary embodiment.

Again, in some embodiments, valve seats 54', 56' can include a shape or configuration that allows precise control over the surface area in which coated portions of valve body 52' and valve seats 54', 56' contact one another. FIG. 11 illustrates an enlarged view 80' of valve body 52' and valve seat 54' of FIG. 9, including coatings 96', 100' on surfaces 88', 94', 102' of valve body 50 and valve seat 54, respectively. As shown, body 52' includes a curvilinear or substantially-spherical surface 88'. In addition, seat 54' can include a first surface region 84' having a curvilinear shape that conforms to the shape of valve body surface 88', thereby providing substantially flush engagement of coatings 96', 100' of valve body 52' and valve seat 54' at the first surface region 84'.

In addition, in some embodiments, valve seat 54' may include a second region 86' that has a surface configuration selected to prevent contact between a valve seat surface 94' and valve body surface 88' along the second region 86'. For example, in some embodiments, second surface region 86' may include a surface angled away from valve body. Further, similar to the substantially conical section of second region 86 of FIG. 8, seat 54' and body 52' may include a gap 92' between valve body 52' and valve seat 54' beginning at second region 86'.

Similar to the embodiments of FIGS. 7-8, the width of first region 84' may be selected to produce a precise surface area of contact between valve body 52' and seat 54'. For example, the surface area may be selected such that the contact force between valve body 52' and valve seat 54' does not exceed the yield strength of selected coatings 96', 100', thereby reducing the likelihood of damage or wear of coatings 96', 100'.

The desired shape and size of selected valve seats may be produced using one or more of a number of manufacturing techniques. For example, in some embodiments, a valve seat substrate may be selected, and the seat shape may be produced using conventional techniques known in the art. Further, the desired size and shape of surface regions 84, 84', 86, 86' can be formed using machining processes such as coining, lapping, or other suitable techniques, while taking into account the size of a coating to be added. Subsequently, a selected coating, such as chromium nitride, other metal nitrides, or DLC materials may be applied to the preshaped substrate to produce valve seats having configurations described above.

As described above, the coatings of opposing surfaces of valve bodies 50, 52' and valve seats 54, 54', 56, 56 may be configured to provide resistance to wear. However, in some configurations, the coating on one of the valve body or the valve seat may wear during initial use. This may result in a small rim on, for example, a valve seat. However, the combined valve body and valve seat may still continue to produce a good seal and control of fluid flow. Further, it is contemplated that the coatings and valve components described herein may be used with other valve types, including other differential-angle valves, which may not include a flush surface region before break-in.

INDUSTRIAL APPLICABILITY

The present disclosure provides improved valves for fuel system components. The disclosed valves may include surface coatings and surface geometries configured to provide low wear and high reliability. The disclosed valves may be used to control fluid flow in systems in which valve components are configured to engage one another in impact or in other physical relationship (e.g., sliding engagement).

The valves of the present disclosure can include a valve body and valve seat having coated surfaces configured to engage one another. The coated valve components can include a number of suitable hard coatings, including, for example, a metal nitride, such as chromium nitride, or DLC materials.

In some embodiments, the valves and valve seats can include coated surfaces configured to engage one another, and during initial use, the coating on one component will wear, such that bare substrate is partially exposed. This break-in process may occur using valve geometries in which the coated components are not in flush engagement (e.g., using differential angle conical valves, or ball-on-seat type geometries). Further, this break-in process may occur for some coatings with the disclosed geometries described herein. However, even with this break-in process, the coated components of the present disclosure can provide improved valve sealing and reduced failure rates.

Conventional valves, such as three-way valves, typically include only one or no coated components on opposing surfaces. Further, during initial use, one or both of the opposing surfaces of the valves may be deformed to produce a surface having a potentially smoother finish, and also producing flush engagement between a portion of the opposing valve components, thereby preventing valve leakage and ensuring continued operability. This type of deformation may occur until the contact areas between the opposing parts increases sufficiently such that the stress on the materials is equal to or less than the yield strength of the material.

However, coated valve components will generally not undergo plastic deformation as easily as uncoated components to produce a shape that provides flush engagement between a valve body and seat. Rather, unless the desired size of the engagement area for the coated component is produced before use of the valve, part of the coating may be worn off at narrow regions of high stress between opposing surfaces. In order to optimize valve performance, the contact area between two opposing valve surfaces should not be too large. Therefore, improved valve geometries may be needed to provide precise control of the contact surface area between a coated valve body and coated valve seat.

The present disclosure provides improved valve seat geometries that allow such control. The valve seats of the present disclosure may include multiple surface regions. A first surface region provides contact between a valve body and valve seat, and a second surface region is configured to prevent contact between the valve body and valve seat outside of the selected first surface region. In some embodiments, the valves of the present disclosure include curvilinear valve bodies that may be configured to engage conical valve seats or curvilinear seats. Further, the geometries of the disclosed valve seats can be used with a number of valve body configurations, including conical valve bodies, as may be used in differential-angle conical valves, and spherical valve bodies.

It should be noted that the coated fuel system components may be used to provide improved resistance to wear, and consequently reduced failure rates, using any type of fuel. However, the disclosed components, in addition to providing improved wear resistance with conventional gasoline or diesel fuels, may also be useful for reducing wear with newer fuel types that may produce high wear rates with other fuel system components. For example, such fuels can include, low lubricity diesel fuel, ultra-low sulfur fuels, biodiesels, JP8 fuel, Toyu fuel, and/or fuels containing various fuel additives such as methyl soyate, or other organic additives.

It will be apparent to those skilled in the art that various modifications and variations can be made in the disclosed systems and methods without departing from the scope of the disclosure. Other embodiments of the disclosed systems and methods will be apparent to those skilled in the art from consideration of the specification and practice of the embodiments disclosed herein. It is intended that the specification and examples be considered as exemplary only, with a true scope of the disclosure being indicated by the following claims and their equivalents.

What is claimed is:

1. A fuel system component with a break-in coating, comprising:
- a valve body configured to repetitively make and break contact with a valve seat during operation of the component, the valve body having a substantially conical surface including a first coating; and
- the valve seat including:
  - a first surface having a substantially conical shape and making a first angle with respect to a longitudinal axis of the valve seat,
  - a second surface positioned radially outwards the first surface and having a substantially conical shape, the second surface making a second angle with respect to the longitudinal axis, the second angle being greater than the first angle when measured in a same direction, and
  - a second coating on the first surface and the second surface, wherein the valve body is configured to contact the valve seat at the first surface and not the second surface when the valve body is in contact with the valve seat.

2. The fuel system component of claim 1, wherein the first surface is shaped to provide substantially flush engagement with the substantially conical surface of the valve body.

3. The fuel system component of claim 2, wherein the first coating and the second coating include at least one of a metal nitride and a diamond like carbon coating.

4. The fuel system component of claim 3, wherein the first coating and the second coating include a metal nitride.

5. The fuel system component of claim 4, wherein the first coating and the second coating include chromium nitride.

6. The fuel system component of claim 1, wherein at least one of the first coating and the second coating includes one of zirconium nitride, molybdenum nitride, titanium-carbon-nitride, or zirconium-carbon-nitride.

7. A method of producing a fuel system component having a break-in coating, comprising:
- producing a valve body having a first substantially conical surface and a second substantially conical surface spaced apart from each other along a longitudinal axis of the valve body, the valve body being configured to repeatedly make and break contact with a first valve seat and a second valve seat during operation of the fuel system component;
- applying a first coating to the first substantially conical surface and the second substantially conical surface of the valve body;
- producing the first valve seat annularly disposed about the valve body proximate the first substantially conical surface, the first valve seat including a first surface and a second surface positioned radially outwards the first surface, the first surface and the second surface having a substantially conical shape, wherein the first surface makes a first angle with respect to the longitudinal axis and the second surface makes a second angle with respect to the longitudinal axis, the second angle being greater than the first angle when measured in a same direction;
- producing the second valve seat annularly disposed about the valve body proximate the second substantially conical surface, the second valve seat including a third surface and a fourth surface radially outwards the third surface, the third surface and the fourth surface having a substantially conical shape, wherein the third surface makes a third angle with respect to the longitudinal axis and the fourth surface makes a fourth angle with respect to the longitudinal axis, the fourth angle being greater than third angle;
- applying a second coating to the first surface of the first valve seat and the third surface of the second valve seat; and
- assembling the fuel system component such that (i) when the valve body contacts the first valve seat, the first substantially conical surface of the valve body contacts the first surface and not the second surface of the first valve seat, and (ii) when the valve body contacts the second valve seat, the second substantially conical surface of the valve body contacts the third surface and not the fourth surface of the second valve seat.

8. The method of claim 7, wherein the first surface of the first valve seat and the third surface of the second valve seat are shaped to provide substantially flush engagement of the first substantially conical surface with the first surface and the second substantially conical surface with the third surface.

9. The method of claim 7, wherein assembling the fuel system component includes positioning the valve body, the first valve seat, and the second valve seat such that the valve body is configured to contact the first valve seat and the second valve seat in impact during operation of the fuel system component.

10. The method of claim 7, wherein the first coating and the second coating include a metal nitride.

11. The method of claim 10, wherein the first coating includes chromium nitride.

12. The fuel system component of claim 11, wherein the second coating includes chromium nitride.

13. The fuel system component of claim 1, wherein at least one of the first coating or the second coating has a thickness between about 0.5 microns and about 1.7 microns.

14. The fuel system component of claim 1, further including a bond layer between the first valve seat and the second coating, the bond layer including a material different from the second coating.

15. A fuel injector, comprising:

a solenoid;

a valve operated by the solenoid, the valve including:

a valve body extending along a longitudinal axis of the fuel injector and including a first conical surface longitudinally spaced apart from a second conical surface, the first conical surface and the second conical surface including a first coating; and a first valve seat proximate the first conical surface and a second valve seat proximate the second conical surface, wherein the valve body is configured to move towards the solenoid to contact the first valve seat and away from the solenoid to contact the second valve seat during operation of the fuel injector, wherein at least one of the first valve seat and the second valve seat includes:

a first surface having a substantially conical shape and including a second coating, the first surface making a first angle with respect to the longitudinal axis and having a width such that, when the valve body contacts the at least one of the first valve seat and the second valve seat, a force generated by the contact does not exceed a yield strength of the first coating and the second coating;

a second surface positioned radially outwards the first surface and having a substantially conical shape, the second surface making a second angle with respect to the longitudinal axis, the second angle being greater than the first angle when measured in a same direction.

16. The fuel injector of claim 15, wherein both the first valve seat and the second valve seat includes the first surface and the second surface.

17. The fuel injector of claim 15, wherein, when the valve body contacts the at least one of the first valve seat and the second valve seat, the valve body contacts the first surface and not the second surface.

18. The fuel injector of claim 15, wherein the first valve seat and the second valve seat are positioned around the valve body.

19. The fuel injector of claim 15, wherein the first coating and the second coating include a metal nitride.

20. The fuel injector of claim 15, wherein the first coating and the second coating include chromium nitride.

21. The fuel injector of claim 15, wherein at least one of the first coating or the second coating has a thickness between about 0.5 microns and about 1.7 microns.

22. The fuel injector of claim 15, further including a bond layer between the at least one of the first valve seat and the second valve and the second coating.

23. The fuel injector of claim 22, wherein the bond layer includes a material different from the second coating.

24. The fuel injector of claim 22, wherein the bond layer is between about 0.05 microns and about 0.5 microns thick.

25. The fuel injector of claim 15, wherein at least one of the first coating and the second coating includes one of zirconium nitride, molybdenum nitride, titanium-carbon-nitride, or zirconium-carbon-nitride.

* * * * *